United States Patent
Izadinia et al.

(10) Patent No.: US 6,433,527 B1
(45) Date of Patent: Aug. 13, 2002

(54) PHASE FAILURE DETECTOR FOR MULTI-PHASE SWITCHING REGULATORS

(75) Inventors: Mansour Izadinia, Los Altos; Hendrik Santo, Milpitas, both of CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 0 days.

(21) Appl. No.: 09/872,871

(22) Filed: Jun. 1, 2001

(51) Int. Cl.[7] ................................................ G05F 5/00
(52) U.S. Cl. ........................ 323/300; 361/85; 363/56.01
(58) Field of Search ................................. 323/300, 320; 363/55, 56.03, 56.04, 56.05, 56.01; 361/85

(56) References Cited

U.S. PATENT DOCUMENTS

| | | | | |
|---|---|---|---|---|
| 4,024,438 A | * | 5/1977 | Priegnitz | 361/92 |
| 4,393,430 A | * | 7/1983 | Hughes | 361/92 |
| 5,077,626 A | * | 12/1991 | Barnes | 361/85 |
| 5,446,366 A | * | 8/1995 | Bassett et al. | 323/222 |
| 5,751,564 A | * | 5/1998 | Dien | 363/37 |
| 5,825,133 A | * | 10/1998 | Conway | 315/105 |
| 5,870,296 A | * | 2/1999 | Schaffer | 363/65 |

* cited by examiner

*Primary Examiner*—Adolf Deneke Berhane
(74) *Attorney, Agent, or Firm*—Perkins Coie LLP

(57) ABSTRACT

The present invention offers a low cost, reliable, on chip implementation that takes advantage of the nature of the average current mode topology to detect phase failures within a multi-phase system. The invention further includes sensing average current to the load, generating error voltages and changing duty cycles when the sensed load current is not at the desired level.

20 Claims, 3 Drawing Sheets

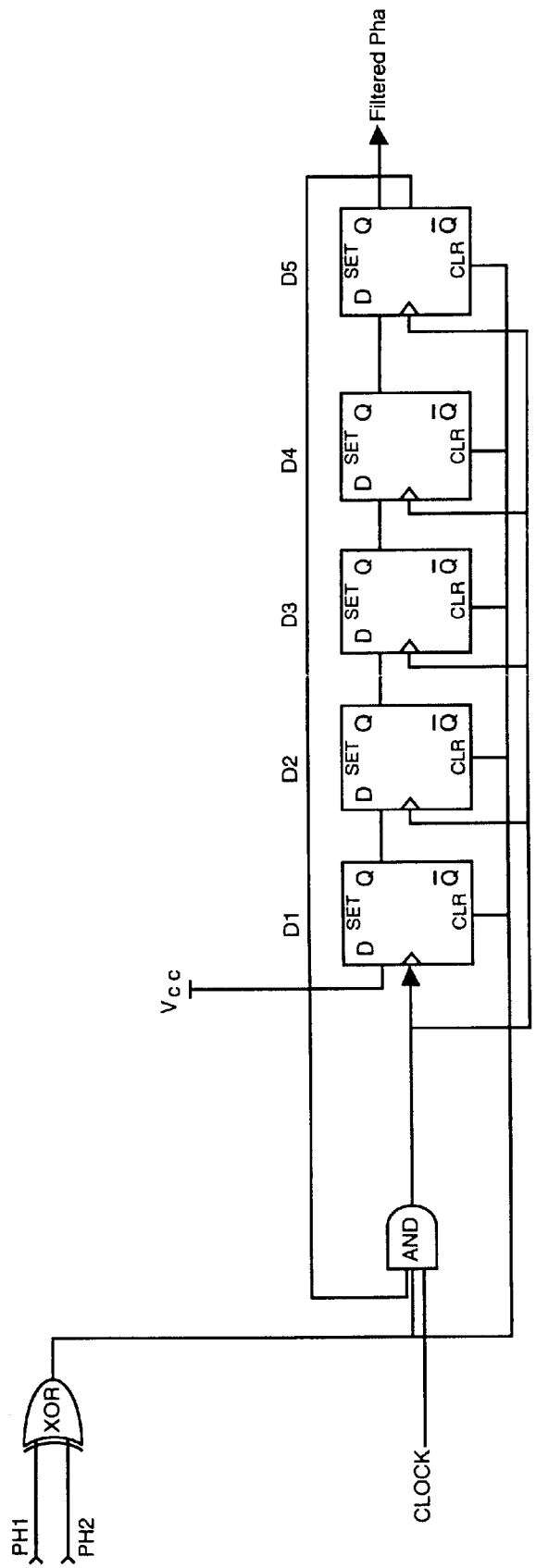
Figure 3  XOR AND DIGITAL FILTER

PHASE FAILURE DETECTOR FOR MULTI-PHASE SWITCHING REGULATORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates to electrical circuits that provide power to a load in a multi-phase manner. These types of circuits are referred to as DC to DC converters or buck converters or step-down converters. These switching circuits may be used in a number of different environments, including providing power to microprocessors.

As integrated circuits become more complex and operate at higher levels of performance, maintaining the power source to the integrated circuit (IC) within required operating ranges becomes increasingly difficult. Several of the problems associated with supplying power to modern ICs are described as follows.

The main problem associated with supplying power to modern ICs is voltage regulation. The modern trend is for smaller and smaller voltage supply levels. In modern electronic systems, high performance ICs such as microprocessors may require a different voltage level than other circuits within the system. The common solution is to provide an external voltage converter or regulator near the high performance IC to supply the required voltage so that the rest of the system may be supplied with a standard voltage.

The circuit of FIG. 1 shows a conventional DC-to-DC power converter that is widely used to supply power to electronic devices, such as in computers, printers, and other devices. Such DC-to-DC converters are available in a variety of configurations for producing the desired output voltage from a source voltage. For example, a step down converter produces an output voltage that is less than the source voltage. A typical step down converter includes one or more power switches which are pulse width modulated to connect the source voltage to an output inductor to thereby power the load. The converter includes a gate driver for the high side switch, and a high speed peak current control loop. A portion of the converter's DC output is applied to a transconductance error amplifier that compares the fed back signal with an internal reference voltage. The feedback signal is generated by a resistor divider connected across the output of the converter.

The transconductance error amplifier compares the DC level of the fed back voltage with an internal reference, while providing voltage loop compensation using external resistors and capacitors. A signal proportional to the output inductor's current may be used to limit component stress during output overloads (overload protection). However, a regulation application needs a higher fidelity current signal than the overload protection application. Typically the heat sinks and thermal design of the DC-to-DC converter are sized for efficiency, and the worst case variation of the overload trip level (current signal) still maintains the components below their maximum ratings.

There are several methods of controlling the regulation of the output voltage. These methods are commonly known as voltage mode control, peak current mode control, and other various methods. Another one of these methods is average current mode control. The embodiment of this invention shown in FIG. 1 utilizes average current mode control.

Perhaps the most common approach to sensing the output inductor current in a step own converter uses a sensing resistor connected in series with the output inductor. The circuit reconstructs the output inductor current as a differential voltage across the sensing resistor. Most IC's using this approach regulate the output voltage with current mode control and use the signal for output voltage feedback.

Multiphase converters have also been employed in the DC—DC converter topologies. For example, a dual interleaved DC—DC converter uses two buck converters in parallel. However, these two converters are switched 180 degrees out of phase with each other. There are several advantages associated with multiphase converters. They include reduced output voltage ripple and reduced input current ripple. Therefore multiphase converters are commonly used for supplying high performance CPU power.

The conventional multi-phase circuits as described are capable of monitoring individual phase currents and provide automatic duty cycle adjustment to keep the inductor currents in the interleaved DC to DC switching circuits balanced. The prior art circuits fail however, to teach any means or method of detecting a phase failure within the system. It is common that one phase of a multi-phase system may fail and go undetected, as power may still be supplied by the other working phases. Therefore a solution is required that takes into account all the above mentioned problems and limitations associated with providing power to IC chips.

SUMMARY OF THE INVENTION

The drawback of the conventional interleaved DC to DC switching circuits is that they are incapable of detecting when one of the phases has failed. Often while in operation, a single phase within a multi-phase system will fail. It is common that even with a failed phase, the working phases will still provide power to the load. These undetected phase failures cause regulators to operate under high stress conditions as they must carry additional current normally provided by the failed phase. It should be noted that while the current is higher than usual, the voltage tends to stay within appropriate bounds thereby masking the phase failure. The high stress operation of the regulators causes faulty circuit operation and usually component malfunction or destruction. The present invention offers a low cost, reliable, on chip implementation that takes advantage of the nature of the average current mode topology to detect phase failures within a multi-phase system.

BRIEF DESCRIPTION OF THE DRAWINGS

These and other objects, features, and characteristics of the present invention will become apparent to one skilled in the art from a close study of the following detailed description in conjunction with the accompanying drawings and appended claims, all of which form a part of this application. In the drawings:

FIG. 3 shows the digital filter used in accordance with one embodiment of the present invention.

DETAILED DESCRIPTION OF THE INVENTION

Detecting the failure of a phase of a multiphase converter using peak current mode converters or voltage mode controllers, or any other control method in which the average inductor current is not available, is not feasible. Within the peak current mode control, one needs to add additional circuitry to extract the average current information. Control methods other than average current mode control also require the addition of circuitry to extract the information about the average current flowing through each phase.

Figure 1:
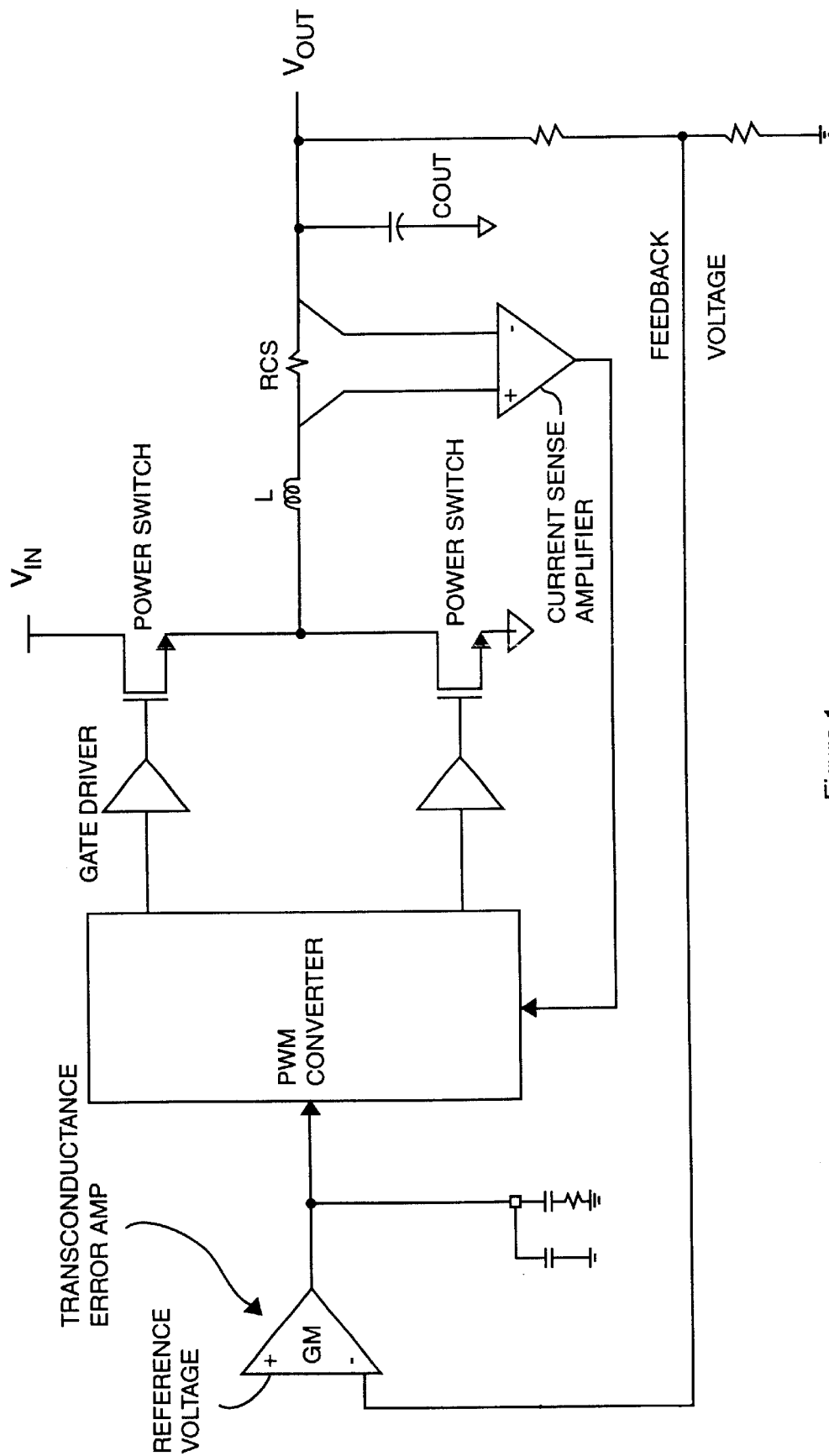
FIG. 1 shows a conventional DC to DC converter circuit.
Figure 2:
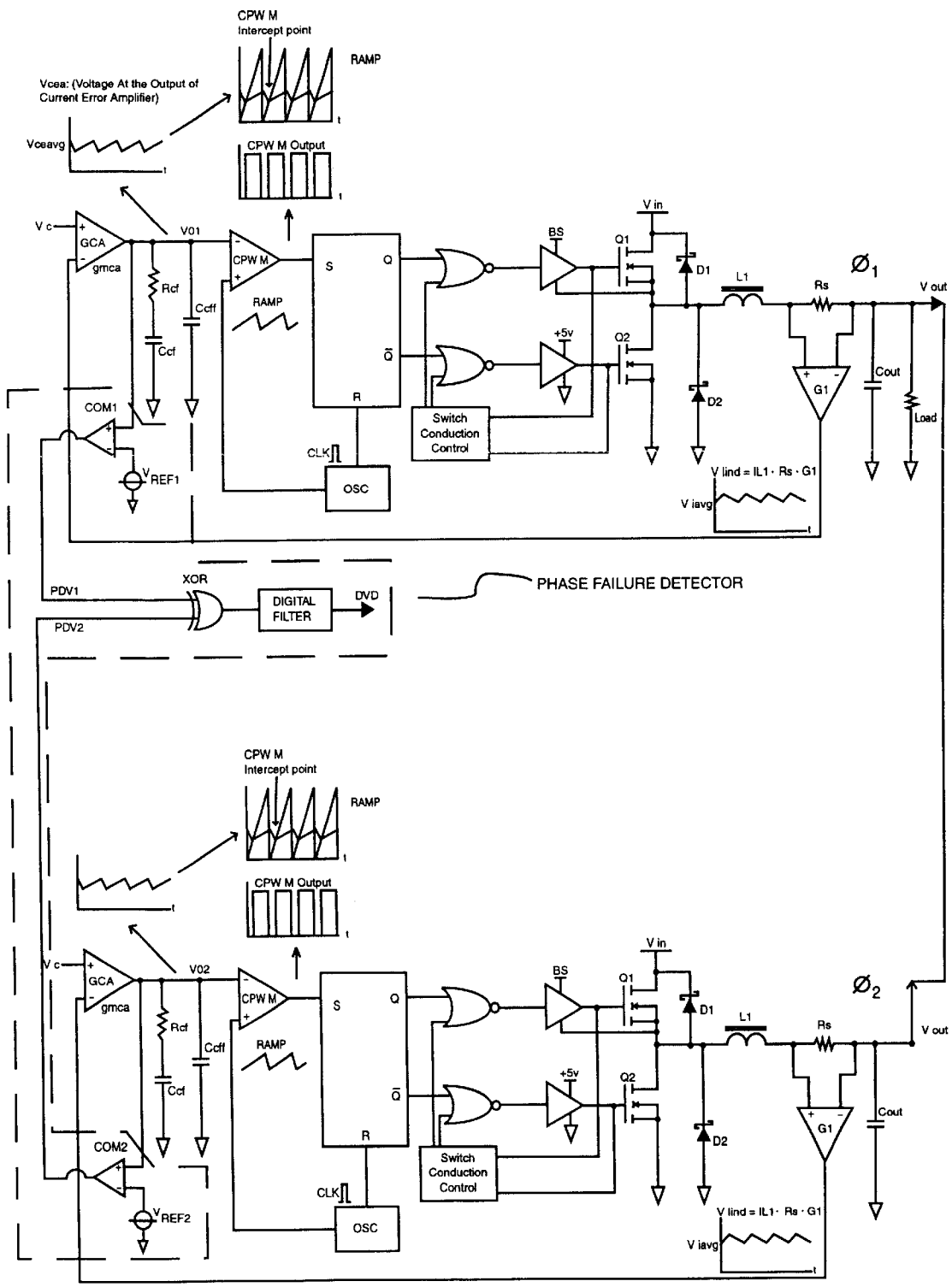
FIG. 2 shows the circuit in accordance with one embodiment of the present invention.

Referring now to FIG. 2, the preferred embodiment of the present invention is shown. This schematic shows the detection of phase failure within a two-phase system, however it is noted that this type of detection technique could be employed in systems with 3 or more phases. The two phases of FIG. 2 deliver power to a load resistance RLOAD. This would represent a microprocessor unit for example. The average current mode architecture has been employed. The output voltage is regulated by commanding an average inductor current which is proportional to the error voltage between the desired output voltage and the actual output voltage. Control voltage VC is the error between desired and actual voltage. The current in each phase circuit is sensed by resistor RS. This current through RS becomes a voltage, which is inputted into the terminals of amplifier G1. This signal is then sent to amplifier GCA to be compared with a command voltage VC. The output signal VO1 from amplifier GCA represents the average difference between the actual output phase current and the desired value of phase current. The VO1 signal is used to control the duty cycle of the phase as it is fed to comparator CPWM, and is also fed to comparator COM1 to be compared with a reference signal VREF. A phase failure is detected when the output of COM1 goes high and the output from COM2 stays low. If signal PDV1 is high and signal PDV2 is low, the XOR gate will go high indicating a phase failure. The output of the XOR gate is then fed to a filter which may be analogue or digital.

As mentioned above, signal VO1 is also used to control the duty cycle of phase 1. The combination of comparator CPWM, flip-flop F1, oscillator clock OSC1, logic gates LG1~LG4, diodes D1 and D2, and transistors Q1 and Q2 comprise an embodiment of a pulse width modulation controller. The operation of the pulse width modulation controller (PWMC) controls the duty cycle of the phase. As is known in the art, the term "duty cycle" refers to the amount of chopping of a constant dc voltage. The PWM controller includes a high frequency (several hundred kilohertz) oscillator which initiates a PWM cycle, furthermore it outputs a PWM ramp. The comparison of the PWM ramp with VO1 will determine the on and off times of transistors Q1 and Q2. As the difference between desired and sensed current increases, the duty cycle is changed appropriately. For example, a large error signal would cause an increased duty cycle. The chopped phase signal is then output to inductor L1 and capacitor C1 to smooth out the phase current. This phase current is then delivered to the load and is monitored by resistor RS.

The operation of the circuit of FIG. 2 detecting a failure of phase 1 would be as follows. If no current flows through resistor RS, no voltage would be dropped across RS. Therefore the phase 1 current sense amplifier G1 would output a zero voltage or low signal. A low signal fed into the negative terminal of transconductance amplifier GCA compared with the command voltage VC fed into the positive terminal of transconductance amplifier GCA would result in a current being sourced out of the CGA amplifier. This sourced current will charge the loop compensation capacitor connected to the output of GCA. As the compensation capacitor is being charged, it will be compared to a VREF voltage by the comparator COM1. A high VO1 signal applied to the PWMC would increase the duty cycle of phase 1 in an attempt to provide more power to the load. A phase failure signal PDV1 is then in a high state and is fed to the XOR gate. Given that phase 2 is operational, signal PDV2 would be low and therefore the XOR gate would produce a high output indicative of a phase failure. In this example all the load current would be carried through the components of phase 2. Obviously this is detrimental to the phase 2 system. Continuous conduction of the load current by the components of phase 2, can deteriorate their life time and could result in failure of phase 2 components.

As explained above, the average current mode control regulates the output voltage by monitoring the average current flowing through the output inductor. Since the magnitude of the average current is known, one can detect a phase failure by detecting a drop in the average current. For noise rejection the fault detection signal can be filtered.

FIG. 3 shows the one implementation of the filter used to detect phase failures. In the preferred embodiment this filter is constructed as a digital filter. It is noted that an analogue filter may also be used. FIG. 3 shows signals PH1 and PH2 input into an XOR gate. The output from this gate goes to an AND gate. A total of 5 flip-flops are shown connected in a serial shift register manner. If the output of the XOR gate is high, indicating a phase failure, then the clock signal (shown as CLK) connected to the input of the AND gate is passed to the clock input of the first flip-flop D1. The data input of the flip-flop is connected to the supply voltage. Therefore a "1" state is clocked into the first flip-flop when the first flip-flop is clocked as a result of a phase failure detection. All the flip-flops are clocked at the same time; therefore the "1" state of the first flip-flop ripples through the succeeding flip-flops every time the clock goes high, assuming that the XOR gate maintains a "1" state, i.e. a phase failure is still being detected. The flip-flops get reset if the output of the XOR gate goes low. This means that the phase failure detection has to last for a minimum of 5 clock cycles before the signal DVD goes high. Thus this circuit essentially accomplishes digital filtering.

The present invention therefore allows simultaneous average current detection and phase failure detection in multiphase circuits.

What is claimed is:

1. A multiphase DC to DC switching circuit contained on a single integrated circuit chip for controlling power switching devices in a DC to DC converter having first and second converter circuits operating to provide power to a common load comprising:

a current sense circuit sensing the voltage across a sense resistor in series with the common load;

a first pulse width modulator controlling a first phase of power switching devices of the first converter circuit;

a second pulse width modulator controlling a second phase of power switching devices of the second converter circuit;

a feedback circuit responsive to the voltage across the sense resistor;

control circuits for controlling the first and second pulse width modulators responsive to the feedback circuit and a commanded output voltage;

the control circuits also being responsive to the detection that one phase is not supplying power to the load.

2. The multiphase DC to DC switching circuit of claim 1 wherein the voltage across the sense resistor is input to an operational amplifier.

3. The multiphase DC to DC switching circuit of claim 2 further comprised of an operational amplifier having an output responsive to the voltage across the sense resistor and a command voltage.

4. The multiphase DC to DC switching circuit of claim 1 wherein a filter is used to determine a phase failure.

5. The multiphase DC to DC switching circuit of claim 4 further comprised of a digital filter.

6. The multiphase DC to DC switching circuit of claim 5 wherein the digital filter receives input signals from logic gates.

7. The multiphase DC to DC switching circuit of claim 4 wherein the filter is an analog filter.

8. The multiphase DC to DC switching circuit of claim 1 wherein the control circuits are also responsive to average current delivered to the load.

9. The multiphase DC to DC switching circuit of claim 8 wherein the control circuit generates an average current that is proportional to an error voltage between a desired output voltage and an actual output voltage.

10. A multiphase DC to DC switching circuit contained on a single integrated circuit chip for controlling power switching devices in a DC to DC converter having first and second converter circuits supplying power to a common load comprising:
    a first phase first pulse width modulator controlling the power switching devices of the first converter circuit;
    a second phase second pulse width modulator controlling the power switching devices of the second converter circuit;
    a feedback circuit responsive to the power supplied by each phase to the common load; and
    a control circuit for controlling the first and second pulse width modulators responsive to the feedback circuit detection that one phase is not supplying power to the common load.

11. The multiphase DC to DC switching circuit of claim 10 wherein the control circuit contains a filter.

12. The multiphase DC to DC switching circuit of claim 11 wherein the filter is a digital filter.

13. The multiphase DC to DC switching circuit of claim 12 wherein the digital filter contains a plurality of flip-flops.

14. The multiphase DC to DC switching circuit of claim 10 wherein the control circuit is responsive to average current delivered to the load.

15. The multiphase DC to DC switching circuit of claim 14 wherein the control circuit generates an average current that is proportional to an error voltage between a desired output voltage and an actual output voltage.

16. The multiphase DC to DC switching circuit of claim 15 wherein the pulse width modulator circuits contain a flip-flop.

17. The multiphase DC to DC switching circuit of claim 16 wherein the pulse width modulator circuits contain a clock oscillator.

18. The multiphase DC to DC switching circuit of claim 15 wherein the desired and actual voltages are compared using an operational amplifier.

19. The multiphase DC to DC switching circuit of claim 10 further comprising a third phase third pulse width modulator controlling the power switching devices of the third converter circuit.

20. The multiphase DC to DC switching circuit of claim 19 further comprising a fourth phase fourth pulse width modulator controlling the power switching devices of the fourth converter circuit.

* * * * *